US009348566B1

(12) United States Patent
Moseley et al.

(10) Patent No.: US 9,348,566 B1
(45) Date of Patent: May 24, 2016

(54) CONTINUOUS PROFILING FOR AUTOMATIC FEEDBACK DIRECTED OPTIMIZATION

(71) Applicant: GOOGLE INC., Mountain View, CA (US)

(72) Inventors: Tipp Moseley, Mountain View, CA (US); Dehao Chen, Mountain View, CA (US); Xinliang David Li, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 95 days.

(21) Appl. No.: 14/146,287

(22) Filed: Jan. 2, 2014

(51) Int. Cl.
*G06F 9/45* (2006.01)
*G06F 11/36* (2006.01)

(52) U.S. Cl.
CPC ............ *G06F 8/443* (2013.01); *G06F 11/3636* (2013.01)

(58) Field of Classification Search
CPC ........ G06F 11/3636; G06F 9/46; G06F 8/443
See application file for complete search history.

(56) References Cited

U.S. PATENT DOCUMENTS

| | | | | |
|---|---|---|---|---|
| 5,915,114 A * | 6/1999 | McKee et al. | ............ | G06F 8/443 714/E11.2 |
| 5,960,198 A * | 9/1999 | Roediger | ............ | G06F 11/3466 714/E11.2 |
| 5,966,538 A * | 10/1999 | Granston | ................ | G06F 8/443 717/158 |
| 6,219,825 B1 * | 4/2001 | Burch et al. | .................. | 717/158 |
| 6,971,091 B1 * | 11/2005 | Arnold et al. | .................. | 717/145 |
| 7,096,499 B2 * | 8/2006 | Munson | ............. | G06F 11/3612 714/E11.209 |
| 2005/0050532 A1 * | 3/2005 | Matsuyama | ................... | 717/158 |
| 2005/0155026 A1 * | 7/2005 | DeWitt | .................... | G06F 8/443 717/158 |
| 2008/0168433 A1 * | 7/2008 | Arnold et al. | .................. | 717/158 |
| 2008/0282232 A1 * | 11/2008 | Cong et al. | ..................... | 717/127 |
| 2011/0016289 A1 * | 1/2011 | Ableidinger | .................. | 711/206 |
| 2011/0214108 A1 * | 9/2011 | Grunberg | ............ | G06F 11/3612 717/128 |
| 2011/0307515 A1 * | 12/2011 | Chen et al. | ..................... | 707/770 |
| 2012/0047491 A1 * | 2/2012 | Blum | .................. | G06F 11/3696 717/127 |

OTHER PUBLICATIONS

David Grove, et al., "Profile-Guided Receiver Class Prediction", [Online], ACM 1995, pp. 108-123, [Retrieved from Internet on Apr. 25, 2015], <http://delivery.acm.org/10.1145/220000/217848/p108-grove.pdf>.*

Chris Lattner et al., "LLVM: A Compilation Framework for Lifelong Program Analysis & Transformation", [Online], ACM 2004, pp. 1-12, [Retrieved from Internet on Apr. 26, 2015], <http://web3.cs.columbia.edu/~junfeng/reliable-software/papers/llvm.pdf>.*

(Continued)

*Primary Examiner* — Thuy Dao
*Assistant Examiner* — Ziaul A Chowdhury
(74) *Attorney, Agent, or Firm* — Birch, Stewart, Kolasch & Birch, LLP

(57) ABSTRACT

A system and method for improving the performance of all applications are disclosed. Production profile data may be collected about each application while the application is executing. The production profile data may be converted into symbolized profiles and stored in a database. The symbolized profiles may be aggregated into a single aggregated profile. This aggregated profile may be used as a compilation input when compiling new versions of an application's binary to improve the application's performance for observed application behavior.

8 Claims, 8 Drawing Sheets

(56) References Cited

OTHER PUBLICATIONS

Gang Ren et al., "Google-Wide Profiling: A Continuous Profiling Infrastructure for Data Centers", [Online], Date:Jul. 30, 2010, pp. 65-79, [Retrieved from Internet on Apr. 26, 2015], <http://courses.cs.washington.edu/courses/cse590g/11sp/36575.pdf>.*

Dehao Chen et al. "Taming Hardware Event Samples for FDO Compilation", [Online], IEEE 2010, pp. 1-11, [Retrieved from Internet on Apr. 26, 2015], <http://www.australianscience.com.au/research/google/36358.pdf>.*

Christian Terboven et al., "Data and Thread Affinity in OpenMP Programs", [Online], ACM 2008, pp. 377-384, [Retrieved from Internet on Jan. 15, 2016], <http://cich.di.uminho.pt/por/content/download/1350/7339/file/p377-terboven.pdf>.*

Sushil Deshmukh et al., "Elasticity of Web Application for Cloud Computing Services", [Online], 2015, pp. 1-6, [Retrieved from Internet on Jan. 15, 2016], <http://spyryan.org/splissue/ipgcon/119.pdf>.*

Lan S. Bai et al., "Automated Construction of Fast and Accurate System-Level Models for Wireless Sensor Networks", [Online], 2011, pp. 1-6, [Retrieved from Internet on Jan. 15, 2016], <http://maqs.pbworks.com/w/file/fetch/05763178.pdf>.*

Jan Murlewski et al, "Comprehensive Approach to Web Applications Testing and Performance Analysis", [Online], IEEE2007, pp. 429-431, [Retrieved from Internet on Jan. 15, 2016], <http://ieeexplore.ieee.org/stamp/number=4297607>.*

\* cited by examiner

```
message AutoFDOConfig{
optional bool disable_autofdo;
optional string cell_re;
optional string user_re;
optional string job_re;
optional int64 max_profile_age_seconds;
}
```

FIG. 4

```
message SampleDBEntry {

//time when the sample was taken, in microseconds
required int64 timestamp_usec;

//the cell of the task
optional string cell;

// the user of the task
optional string user;

// the job name of the task
optional string job_name;

//time when the program was built;
optional int64 build_timestamp;

//change list number when the program was built
optional int64 build_changelist;

//depot path where program was built
optional string build_depot;

//build id
optional string build_id;

//build target
optional string build_target;

// a list of frames representing the stack trace, with the root frame first, leaf frame last
repeated Frame frames;
}
```

FIG. 5a

```
message Frame {

//the count or weight of the metric, such as bytes allocated, cycles, or timer ticks
    required int64;

//program counter for the frame;
    optional uint64 program_counter;

//name of the function, including class name, formatted according to language.
    optional string function_name;

//true if the fame is a leaf frame
    optional bool is_leaf;

//the file in which the method is contained
    optional string file;

//line number within the file where this method is contained
    optional int32 line;

//an optional module, such as the name of a shared library
    optional string load_module;
    optional int32 discrim;
    optional int32 start_line;
}
```

FIG. 5b

CONTINUOUS PROFILING FOR AUTOMATIC FEEDBACK DIRECTED OPTIMIZATION

BACKGROUND

Feedback-directed optimization (FDO) is a technique used to tune application executions based on application runtime behavior in order to improve performance. FDO is also known as Profile Guided Optimization (PGO) and Profile Based Optimization (PBO). In order to tune applications, FDO conducts profiling on the applications. Profiling is the process of gathering information about how an application behaves during runtime. This profile information is used to drive decisions regarding various application optimizations.

As illustrated in FIG. 1, customary feedback-directed optimization is a dual build model technique that uses static instrumentation to collect edge and value profiles. An instrumentation build (101) allows the compiler to insert code into an application's binary to create an instrumented version of the binary (102). This inserted code typically counts edges or collects value profiles. The instrumented binary (102) is run on a representative set of training data (104) in a training run (103). At the end of the training execution, all collected edge counts and value information are written and aggregated in a profile database or gcov data file (GCDA) (105). An optimization build (106) then occurs in which the compiler uses the generated profile to make optimization decisions such as inline decisions, instruction scheduling, basic block re-ordering, function splitting, and register allocation.

AutoFDO is an improvement over traditional FDO because AutoFDO does not require compiling and load testing an instrumented version of an application. Instead, AutoFDO measures an optimized version of the application using hardware performance monitors to obtain a profile of runtime behavior. Automated Feedback-directed optimization, AutoFDO, uses sampling based profiling in order to tune applications.

While AutoFDO is simpler to use than FDO, AutoFDO still requires compiling a binary, running a load test to generate profiles, and recompiling the binary using the generated profile data. Regardless of whether FDO or AutoFDO is performed, collecting profile information is very tedious. As recognized by the inventors, there should be an easier, shorter process for guiding compiler optimization in order to improve application runtime behavior.

SUMMARY

This specification describes technologies relating to application performance improvement in general, and specifically to methods and systems for continuous profiling applications using production profiles to inform automated feedback directed optimization.

In general, one aspect of the subject matter described in this specification can be embodied in a system and method for improving the performance of applications in a production environment based on observed application behavior. An example system includes one or more processing devices and one or more storage devices storing instructions that, when executed by the one or more processing devices cause the one or more processing devices to execute the steps of an example method. An example method includes: while executing applications in a runtime production environment, collecting raw production profile data about an application; converting the raw production profile data into symbolized profiles; storing the symbolized profiles in a database; aggregating, into a single aggregated profile per application, the symbolized profiles collected for each application; and using each aggregated profile as a compilation input when compiling other versions of an application's binary to alter the application's performance for observed application behavior.

These and other embodiments can optionally include one or more of the following features: collecting raw production profile data about the application may include randomly sampling for a specified time period machines in a data center executing all application binaries; aggregating the symbolized profiles may include restricting the raw production profile data by a particular time range, build, cell, job, or user; converting the raw production profile data into symbolized profiles may include mapping raw production profile data back to source code lines in the application using debug information; converting the raw production profile data into symbolized profiles may include mapping the build id, instruction address pairs of the raw data into symbolized triplets of function, file, and line; aggregating the symbolized profiles may include executing a mapping/reduction process on the symbolized profiles to consolidate information; and resulting files may be written to a local destination or aggregated profile file storage.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 4 is an example configuration file.

FIG. 5*a* is an example database entry.

FIG. 5*b* is an example Frame.

DETAILED DESCRIPTION

According to an example embodiment, production profiles may be used to automatically guide (or direct) optimizations based on observed application behavior in order to improve the performances of application binaries. An exemplary system uses production profiles, which measure observed behavior of deployed application binaries to guide compiler optimization.

Figure 1:
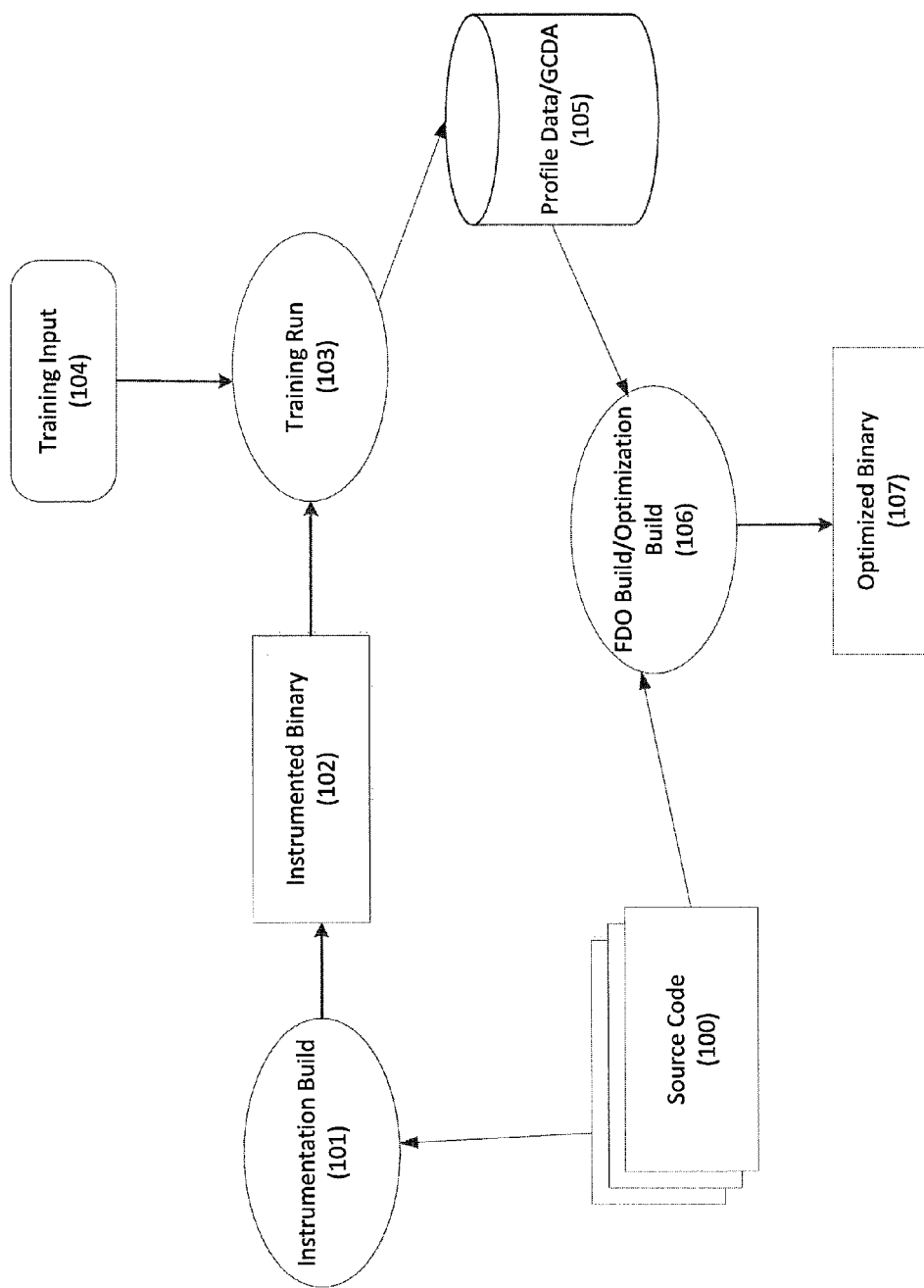
FIG. 1 is a block diagram illustrating a conventional feedback-directed optimization loop.
Figure 2:
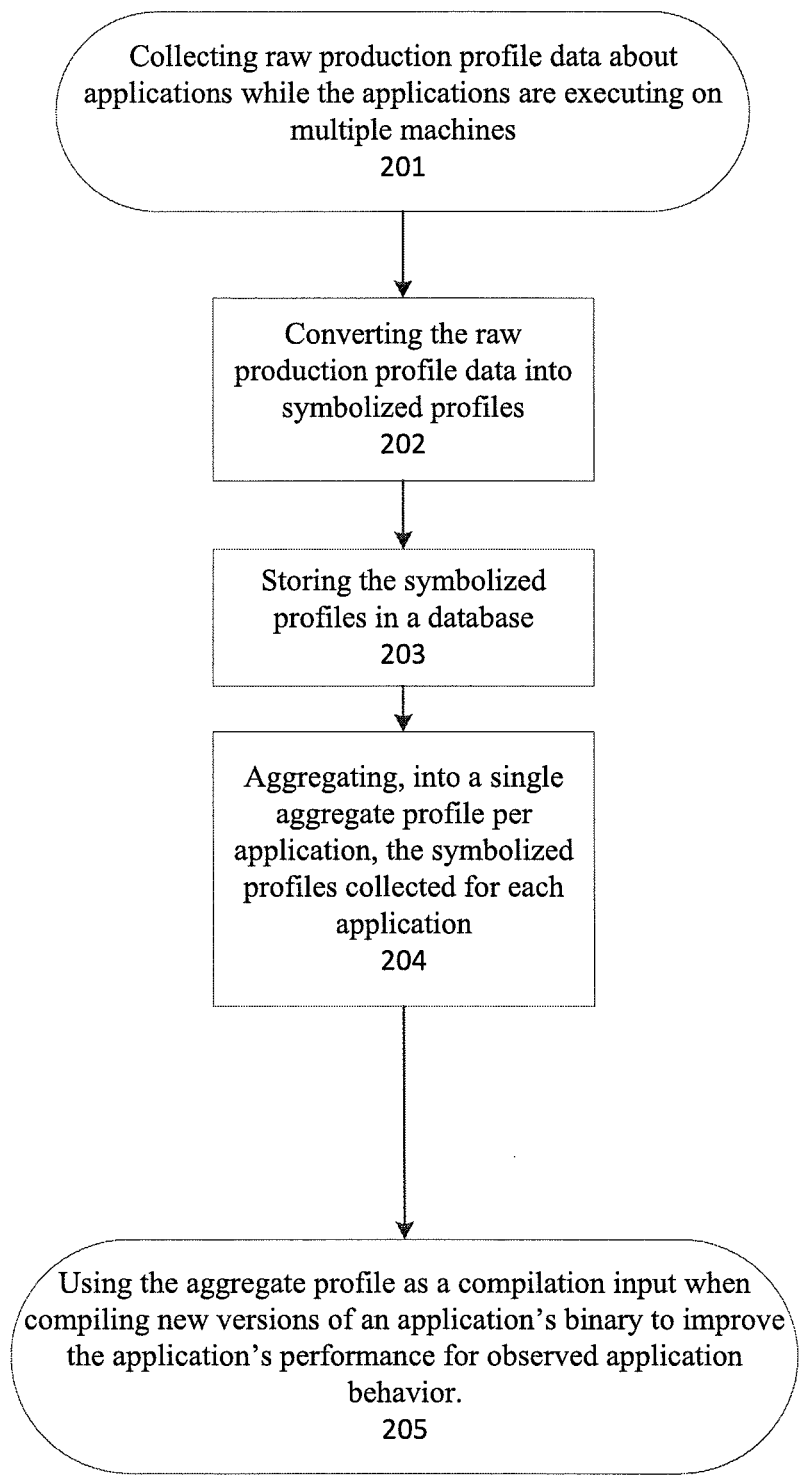
FIG. 2 is a flow diagram of an example method for improving the performance of an application's binary.

An example method begins with collecting production profile data about applications while the applications are executing as illustrated in FIG. 2 (201). Production profiles for applications may be obtained by randomly sampling machines in a datacenter for a specified amount of time. For example, a thousand machines running applications may be sampled for ten seconds each to obtain usable profile information for the applications. During sampling, hardware may record information from applications' executions. Raw profiles for all applications may be collected, showing how many times each instruction is executed by all production machines. Each raw profile may be a map from an instruction address to the instruction's execution count. Sampling may produce sequences of instructions which provide insight into individual application's execution.

Raw profiles, which map instruction address to instruction execution count, may be converted to code locations, including file and line numbers, of the code that executed the recorded instruction (202). To convert raw profiles to "symbolized" profiles, raw profile samples may be mapped back to source code lines in an application using debug information which may be an intrinsic part of the application. An example system may include a symbolize service that may map from {build-id, instruction address} to symbolic info {symbol, {function, file, line}}. Symbolized profiles may then be stored in a profile database (203).

Profile database entries may include metadata that can be used for filtering profiles. Metadata may include: build timestamp, build id, build target, change list number, job, user, and cell, which is a cluster of hundreds or thousands of machines in a data center. An example database entry is shown in FIG. 5a and an example frame is shown in FIG. 5b.

Periodically stored profiles may be aggregated and merged for each application in an aggregate profile (204). For example, a profile in compiler-readable form (such as GCOV format) may be created for the application which a compiler can read. This aggregated profile may be used as a compilation input when compiling new or modified versions of the application's binary to improve or alter the application's performance for observed application behavior (205).

Figure 3:
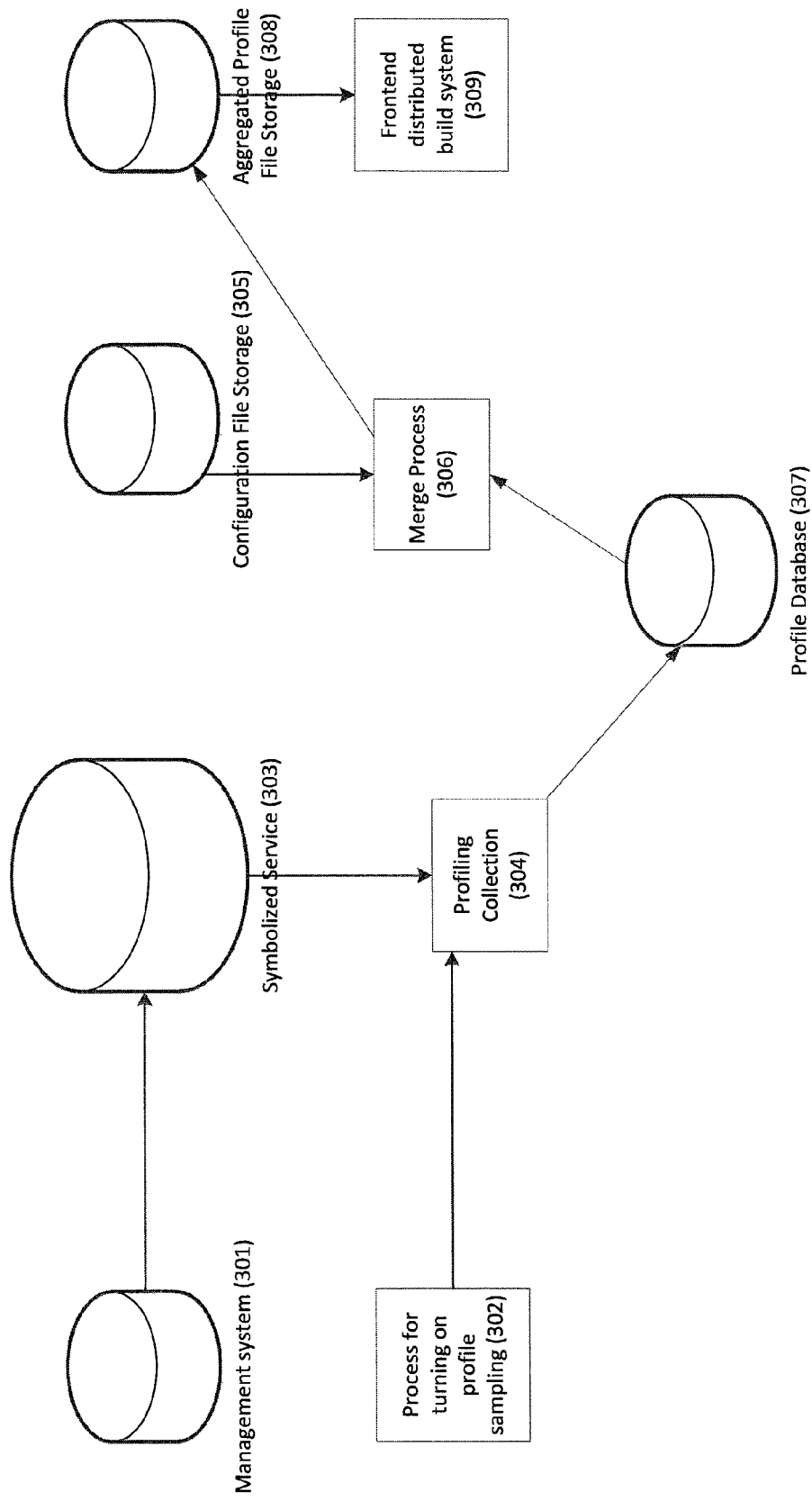
FIG. 3 is a block diagram of an example system for improving the performance of an application's binary.

An example system is illustrated in FIG. 3. An application running in a production environment may contain executable binary and related static data that together form a package or bundle. A management system (301) may build, install, deploy, and garbage collect the versioned packages. It also may store the application packages.

The process for turning on profile sampling (302) may be a daemon process running on all production machines. This process may turn on hardware profile sampling for an application when a client requests profiling. When profiling is requested, profile collection (304) will collect profile information for the application. As discussed above, raw profiles may be converted to symbolized profiles using a symbolize service (303) that uses the management system data to understand code lines and files of an application. The symbolized profiles may be stored in a profile database (307) as discussed above.

In some embodiments, all production samples for a particular application may be merged into an aggregate profile. For example, the aggregation and merging of profile samples may be done by a merge process, or a MapReduce process (306). However, profile samples may be restricted by a particular time range, build, cell, job, or user.

Restrictions may be specified in a configuration file such as the one illustrated in FIG. 4. For example, profile samples may be restricted to only samples from a particular user by specifying the user's id in the configuration file. A default configuration may be to merge all production samples for the target application over the last seven days. To build an aggregated profile, the configuration files for an application may be read from a configuration file storage (305). The configuration files may contain the parameters for preconfigured targets. The profile database may be queried to find all target applications with existing configurations or with sample counts larger than a predefined threshold. If a target application does not have a user-specified configuration, if the application is hot, meaning that it has a sample count larger than a defined threshold, a profile in compiler-readable form, an aggregate profile or AutoFDO profile, may be created and stored in an aggregated profile storage (308).

In order for an aggregated profile to be used in compilation by a frontend distributed build system (309), the aggregated profile may be qualified in some example embodiments. Qualification requirements may include: a total sample count greater than or equal to a minimum threshold and the sample count may not vary more than by a certain threshold compared with a previous profile. If an aggregated profile does not pass qualification, the aggregated profile for the application may not be updated in the aggregated profile file storage.

Although these aggregated profiles may be automatically generated, in some embodiments manual generation may be desired. Tools used in the automated pipeline may be used manually to collect and aggregate profiles. A collect command may collect a select subset of profile data from servers, symbolize the data, and write logs in the profile format. An aggregate, mapreduce command may aggregate profile records based on specified configuration and write the resulting files to a local destination or aggregated profile file storage (308).

Once an aggregated profile is created for an application, the aggregated profile may be used either manually or automatically in compilation in the frontend distributed build system (309). A user can manually specify the aggregated profile to use in compilation or an example system may be able to choose the profile to use for a specific application.

Figure 6:
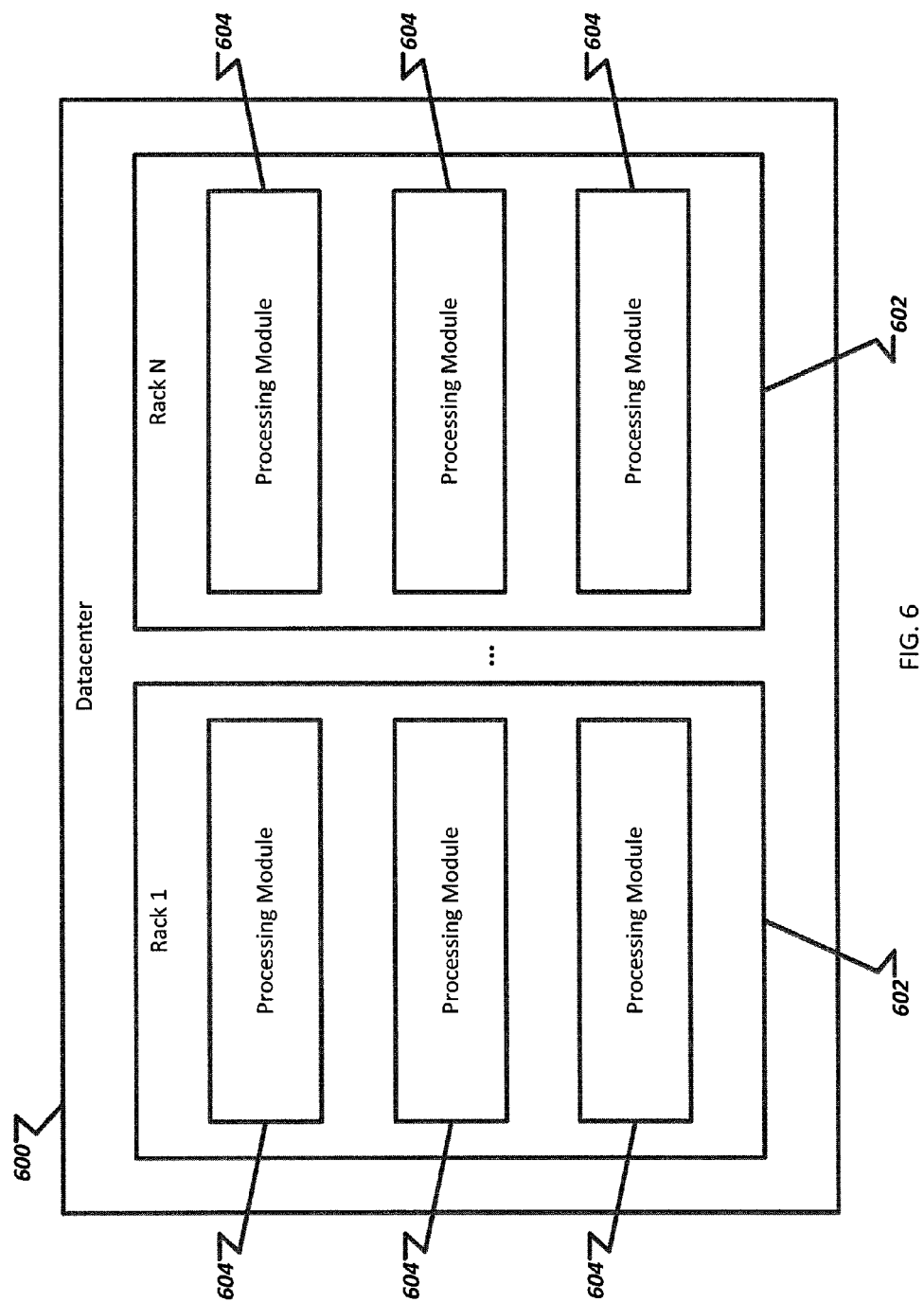
FIG. 6 is an example datacenter.

FIG. 6 is a block diagram illustrating an example of a datacenter (600) where individual applications are executed and sampling occurs. The datacenter (600) is used to store data, perform computational tasks, and transmit data to other systems outside of the datacenter using, for example, a network connected to the datacenter. In particular, the datacenter (600) may perform large-scale data processing on massive amounts of data.

The datacenter (600) includes multiple racks (602). While only two racks are shown, the datacenter (600) may have more racks. Each rack (602) can include a frame or cabinet into which components, such as processing modules (604), are mounted. In general, each processing module (604) can include a circuit board, such as a motherboard, on which a variety of computer-related components are mounted to perform data processing. The processing module (604) within each rack (602) are interconnected to one another through, for example, a rack switch, and the racks (602) within each datacenter (600) are also interconnected through, for example, a datacenter switch.

In some implementations, the processing modules (604) may each take on a role as a master or worker. The master modules control scheduling and data distribution tasks among themselves and the workers. A rack can include storage, like one or more network attached disks, that is shared by the one or more processing modules (604) and/or each processing module (604) may include its own storage. Additionally, or alternatively, there may be remote storage connected to the racks through a network.

The datacenter (600) may include dedicated optical links or other dedicated communication channels, as well as supporting hardware, such as modems, bridges, routers, switches, wireless antennas, and towers. The datacenter (600) may include one or more wide area network (WANs) as well as multiple local area networks (LANs).

Figure 7:
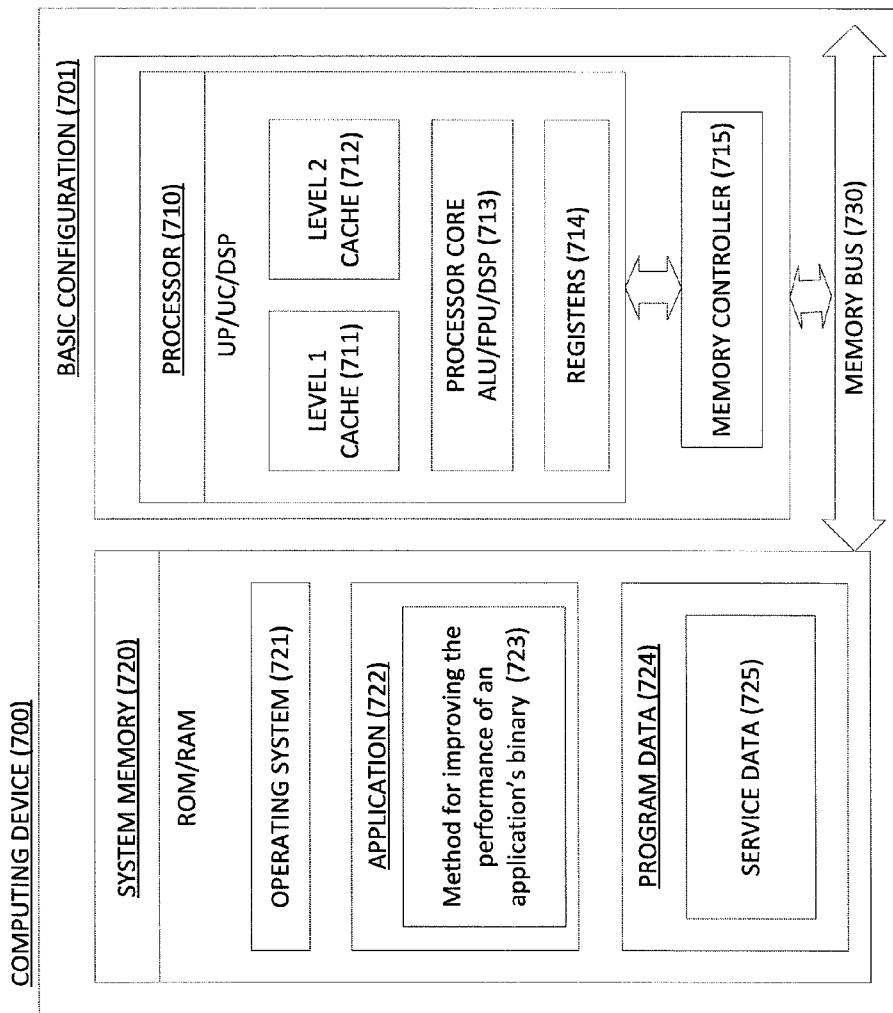
FIG. 7 is a block diagram illustrating an exemplary computing device.

FIG. 7 is a high-level block diagram of an example computer (700) that is arranged for improving the performance of application binaries. In a very basic configuration (701), the computing device (700) typically includes one or more processors (710) and system memory (720). A memory bus (730)

can be used for communicating between the processor (710) and the system memory (720).

Depending on the desired configuration, the processor (710) can be of any type including but not limited to a microprocessor (μP), a microcontroller (μC), a digital signal processor (DSP), or any combination thereof. The processor (710) can include one more levels of caching, such as a level one cache (711) and a level two cache (712), a processor core (713), and registers (614). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a method for improving the performance of application binaries. Program Data (624) includes storing instructions that, when executed by the one or more processing devices, implement a method for application binary optimizations. (723). In some embodiments, the application (722) can be arranged to operate with program data (724) on an operating system (721).

The computing device (700) can have additional features or functionality, and additional interfaces to facilitate communications between the basic configuration (601) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (700).

The computing device (700) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for improving the performance of applications in a production environment based on observed application behavior, the method comprising:

while executing applications in a runtime production environment, collecting raw production profile data about the applications by randomly sampling machines in a datacenter where the sampling produces sequences of instructions which provide insight into an individual application's execution, the raw production profile data being a mapping from an instructions address to the instruction's execution count;

converting the raw production profile data into symbolized profiles by restricting the raw production profile data by a particular time range, build, cell, job, or user and mapping build id and instruction address pairs of the raw production profile data into symbolized triplets of function, file, and line;

storing the symbolized profiles in a database;

aggregating, into a single aggregated profile per application, the stored symbolized profiles collected for each application by executing a mapping/reduction process on the stored symbolized profiles to consolidate information; and using each aggregated profile as a compilation input when compiling other versions of an application's binary to alter the application's performance for observed application behavior.

2. The method of claim 1, where collecting raw production profile data about the application includes:

randomly sampling for a specified time period machines in a datacenter executing all application binaries.

3. The method of claim 1, further comprising writing the results of the mapping/reduction process to a local destination or aggregated profile file storage.

4. A system for improving the performance of applications in a production environment based on observed application behavior, the system comprising
one or more processing devices and
one or more memory storage devices storing instructions that, when executed by the one or more processing devices cause the one or more processing devices to:
while executing applications in a runtime production environment, collect raw production profile data about the applications by randomly sampling machines in a datacenter where the sampling produces sequences of instructions which provide insight into an individual application's execution, the raw production profile data being a mapping from an instructions address to the instruction's execution count;
convert the raw production profile data into symbolized profiles by restricting the raw production profile data by a particular time range, build, cell, job, or user and mapping build id and instruction address pairs of the raw production profile data into symbolized triplets of function, file, and line;
store the symbolized profiles in a database;
aggregate, into a single aggregated profile per application, the stored symbolized profiles collected for each application by executing a mapping/reduction process on the stored symbolized profiles to consolidate information; and
use each aggregated profile as a compilation input when compiling other versions of an application's binary to alter the application's performance for observed application behavior.

5. The system of claim 4, where collecting raw production profile data about the application includes:
randomly sampling for a specified time period machines in a datacenter executing all application binaries.

6. The system of claim 4, further comprising writing the results of the mapping/reduction process to a local destination or aggregated profile storage.

7. A non-transitory computer-readable medium having stored therein computer executable code that causes one or more processors to execute the steps of:
while executing applications in a runtime production environment, collecting raw production profile data about the applications by randomly sampling machines in a datacenter where the sampling produces sequences of instructions which provide insight into an individual application's execution, the raw production profile data being a mapping from an instructions address to the instruction's execution count;
converting the raw production profile data into symbolized profiles by restricting the raw production profile data by a particular time range, build, cell, job, or user and mapping build id and instruction address pairs of the raw production profile data into symbolized triplets of function, file, and line;
storing the symbolized profiles in a database;
aggregating, into a single aggregated profile per application, the stored symbolized profiles collected for each application by executing a mapping/reduction process on the stored symbolized profiles to consolidate information; and
using each aggregated profile as a compilation input when compiling other versions of an application's binary to alter the application's performance for observed application behavior.

8. The computer-readable medium of claim 7, where collecting raw production profile data about the application includes:
randomly sampling for a specified time period machines in a datacenter executing all application binaries.

* * * * *